United States Patent [19]

Shook

[11] 4,405,828

[45] Sep. 20, 1983

[54] BREAKING AND INSULATING CLAMP FOR ELECTRICAL CONDUCTORS

[75] Inventor: David W. Shook, Gastonia, N.C.

[73] Assignee: Insulating Breaking Clamp, Inc., Mount Holly, N.C.

[21] Appl. No.: 363,848

[22] Filed: Mar. 31, 1982

[51] Int. Cl.³ .......................... H01B 17/00; H02G 1/02

[52] U.S. Cl. .............................. 174/138 R; 24/135 R; 174/169; 174/177

[58] Field of Search ..................... 174/138 R, 169, 172, 174/177; 24/135 R, 243 E; 339/265 R

[56] References Cited

U.S. PATENT DOCUMENTS

| | | | |
|---|---|---|---|
| 1,948,061 | 2/1934 | Bowen | 174/172 |
| 3,178,508 | 4/1965 | Norwood | 174/138 R |
| 3,287,491 | 11/1966 | Hubbard et al. | 174/138 R |

*Primary Examiner*—Laramie E. Askin

*Attorney, Agent, or Firm*—Bell, Seltzer, Park & Gibson

[57] ABSTRACT

A breaking and insulating clamp for tensioned electrical conductors is disclosed, and which comprises an elongate bar of an electrical insulating material, with the bar mounting separate clamping members at longitudinally spaced apart locations for separately securing an electrical conductor or the like at each location. This permits the conductor to be severed between the clamping members, so that the remaining portions of the severed conductor are isolated and insulated from each other. In the illustrated specific embodiment, the clamping members each include a U-shaped bolt received within mating channels in the bar so as to preclude relative longitudinal movement between the bar and the bolt, and a pair of cooperating plates mounted on the bolt. The plates are designed to be clampingly pressed together so as to securely retain an electrical conductor extending therebetween in the longitudinal direction. To facilitate the engagement of the conductor, the plates may be provided with mating grooves having internal ridges, for receiving and bitingly engaging the conductor.

13 Claims, 10 Drawing Figures

BREAKING AND INSULATING CLAMP FOR ELECTRICAL CONDUCTORS

The present invention relates to a breaking and insulating clamp for tensioned electrical conductors and the like, and which is characterized by the ability to clamp spaced portions of the conductor to permit the severance of the conductor between the spaced portions.

Electrical distribution systems for homes and businesses typically utilize a secondary or distribution circuit which is composed of three conductors or lines, which are usually strung under the high power lines on the distribution poles. Two of these conductors are hot or charged, and the third is neutral. In such systems, it is frequently necessary to break or sever the conductors to isolate two portions of the conductors from each other, while maintaining the tensioned condition of the conductors. A typical example of when this procedure would be necessary would be a distribution circuit having transformers connected therein, and wherein it is necessary to connect another transformer to reduce the load upon the existing transformer, or to accommodate for an increased load. In such instances, the conductors of the distribution circuit are severed at a location between the existing transformer and the point where the new transformer is to be connected. The two resulting portions of the severed conductors are then isolated or insulated from each other.

The prior U.S. patent to Norwood, U.S. Pat. No. 3,178,508 discloses a conductor clamping device which is designed to permit a hot conductor to be severed so as to isolate the severed end portions from each other, and while maintaining the tensioned condition of the conductor. While this prior device functions satisfactorily, it is relatively expensive, and as a result it has not achieved full utilization by power companies and other potential users. Also, this prior clamping device requires that a number of holes be formed therein, which limits its tensile strength.

It is accordingly an object of the present invention to provide a relatively inexpensive breaking and insulating clamp for tensioned electrical conductors, and which is operable by engaging spaced portions of a hot conductor, so as to permit the conductor to be severed between the spaced portions, and while maintaining the tensioned condition of the conductor.

It is also an object of the present invention to provide a breaking and insulating clamp of the described type which is easily applied by a single lineman, which is of simple and durable construction, and which is not weakened by the presence of any holes.

These and other objects and advantages of the present invention are achieved in the embodiments illustrated herein, by the provision of a breaking and insulating clamp which comprises an elongate bar of an electrical insulating material of relatively high tensile strength, and which includes opposite side faces extending along the longitudinal length of the bar. Shoulder means are formed on the exterior surface of the bar at each of two longitudinally spaced apart clamping locations, and clamping members are mounted to the bar at each of the spaced apart clamping locations. Each clamping member comprises a bolt having two parallel legs mounted to straddle the bar and positioned adjacent the shoulder means so as to preclude relative longitudinal movement between the bolt and bar. Also, each clamping member includes a pair of cooperating plates mounted on the legs of the associated bolt, with nuts being threadedly disposed on the legs of the bolts for clampingly pressing the cooperating plates together so that the plates are adapted to securely retain an electrical conductor which extends therebetween in the longitudinal direction and between the legs of the associated bolt.

In a preferred embodiment, the shoulder means comprises a pair of cooperating channels at each clamping location, with the channels of each pair being formed in the surface of the respective side walls and extending parallel to each other and in a direction substantially perpendicular to the longitudinal direction. Also, the opposing surfaces of each of the pair of plates include a groove extending in the longitudinal direction, with the grooves of the pair being aligned so as to at least partially receive the electrical conductor therebetween. The grooves may further include transverse ridge means for bitingly engaging the electrical conductor.

Some of the objects having been stated, other objects will appear as the description proceeds, when taken in connection with the accompanying drawings in which FIG. 1 is a somewhat schematic view of an electrical distribution system and showing the breaking and insulating clamp of the present invention in use;

Figure 1:
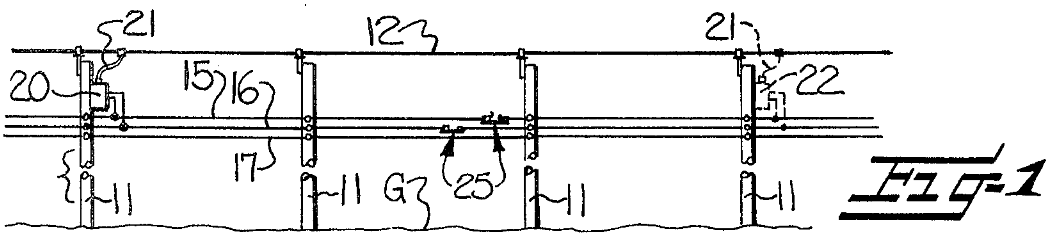

Referring more particularly to the drawings, FIG. 1 illustrates an electrical distribution system, which includes a plurality of upright poles 11 mounted in the ground G. A primary power cable 12 is supported by the insulators mounted on the upper ends of the poles 11. In addition, a secondary or distribution circuit is mounted on the poles, and comprises three conductors or lines 15, 16 and 17. These three conductors are supported by insulators, with the conductors 15 and 16 being the hot power lines, and the conductor 17 being the neutral line of the circuit. A transformer 20 is mounted on one of the poles, and is connected by a cable 21 to the power line 12. The transformer 20 is also connected to the conductors 15 and 16 by suitable connector lines as illustrated.

As noted above, it is often necessary to connect another transformer in the distribution circuit, such as the transformer 22 indicated in dashed lines in FIG. 1. In this case, it is necessary to isolate the portion of the circuit to be served by the added transformer from that portion to be served by the existing transformer 20. For this purpose, it is desired that the conductors 15 and 16 be severed between the two transformers, and the severed portions be maintained under tension and insulated from each other. This function is achieved by the operation of two of the breaking and insulating clamps 25 of the present invention, and as further described below.

Figure 2:
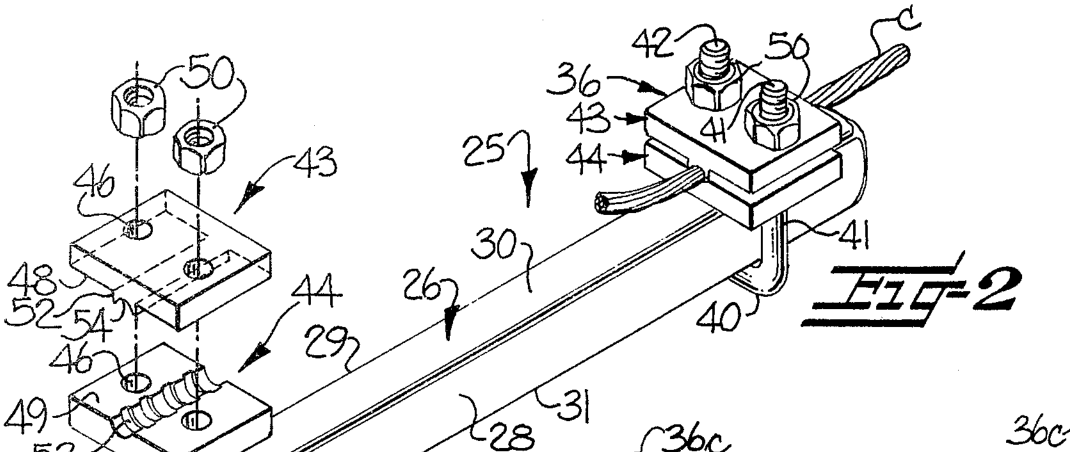
FIG. 2 is a perspective view, with parts exploded, of one embodiment of a breaking and insulating clamp of the present invention.
Figure 2:
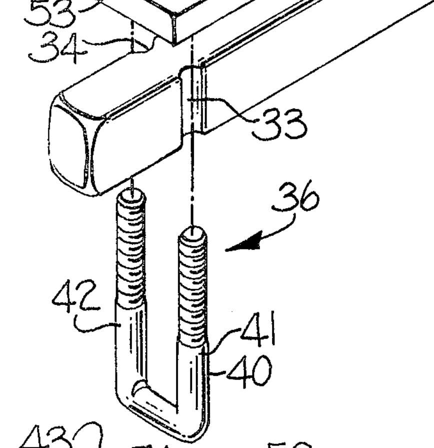

As best seen in FIG. 2, the breaking and insulating clamp 25 comprises an elongate bar 26 composed of an electrical insulating material having a relatively high tensile strength. The bar is preferably rectangular in configuration and defines two opposing side faces 28, 29 which extend along the longitudinal length of the bar, and top and bottom faces 30, 31 respectively. Typically, the side faces 28, 29 are about one inch in width, and the top and bottom faces 30, 31 are about ¾ of an inch in width. As a specific example of the material of the bar, the bar may be formed by extruding a conventional fiberglass reinforced polyester material, and such that the resulting product has a tensile strength of about 124,000 psi and a crush strength of about 20,000 psi.

A pair of cooperating channels 33, 34 are formed in the bar at each of two longitudinally spaced apart clamping locations, with the channels 33, 34 of each pair being formed in the surface of the respective side walls 28, 29 and extending parallel to each other and in a direction substantially perpendicular to the longitudinal direction of the bar. The channels are preferably arcuate in cross section, and in the above specific example of the bar, the channels may be formed by milling to a depth of about 0.075 inches. A clamping member 36 is mounted on the bar at each of the spaced apart clamping locations for separately securing an electrical conductor C or the like at each location. Each of the clamping members 36 comprises a U-shaped bolt 40, having two parallel legs 41, 42 which straddle the bar and are received within respective channels 33, 34 of the associated pair of channels so as to preclude relative longitudinal movement between the bar and the bolt. The legs 41, 42 have a length sufficient to extend beyond the top surface 30 of the bar. Also, the legs 41, 42 are preferably joined to the bar by initially laterally separating the legs and then clamping the same together, so as to clampingly engage the associated channels 33, 34 of the bar therebetween, and thereby securely retain the assembly of each bolt on the bar.

The clamping members 36 further include a pair of cooperating plates 43, 44 each having a pair of apertures 46 which receive the legs 41, 42 of the bolt. The plates 43, 44 include opposing flat surfaces 48, 49 which are adapted to receive the electrical conductor therebetween which extends in the longitudinal direction and between the legs of the associated bolt. Finally, each clamping member 36 also includes a pair of nuts 50 threadedly disposed on the legs of the bolt, for clampingly pressing the cooperating plates together so that the plates are adapted to securely retain the electrical conductor C therebetween. More particularly, the nuts 50 act to press the plate 44 against the top face 30 of the bar, so that the two plates are pressed together between the face 30 and nuts.

Figure 4:
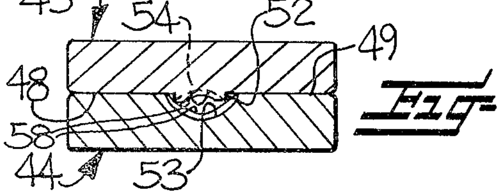
FIGS. 4, 5 and 6 are sectional end views of three different embodiments of the clamping plates utilized with the present invention.
Figure 5:
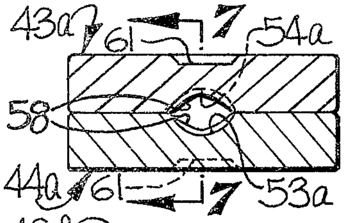
Figure 6:
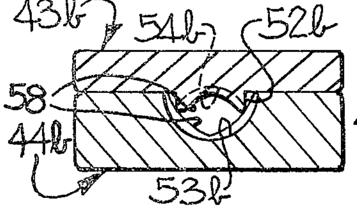
Figure 9:
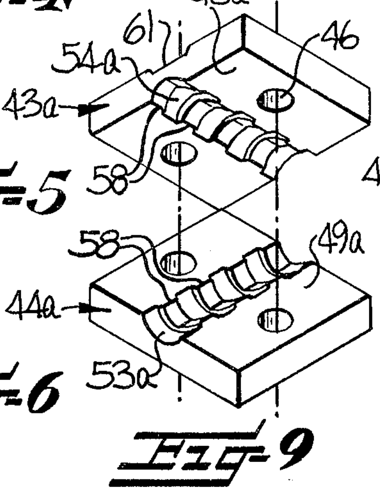
FIG. 9 is a perspective view of the clamping plates of FIG. 5, with the plates being opened to expose the opposing surfaces.
Figure 10:
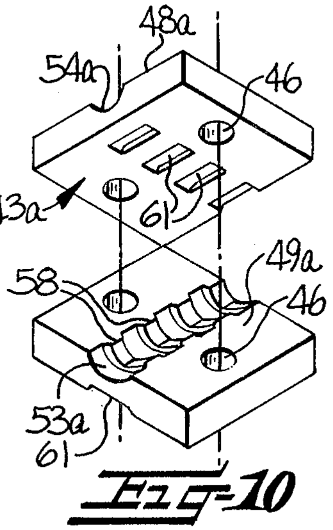
FIG. 10 is a perspective view of the plates of FIG. 5, with the upper plate having been inverted to adapt the same for a smaller conductor.

As best seen in FIGS. 4–6, the opposing surfaces 48, 49 of each of the pair of plates may include a groove extending in the longitudinal direction, with the grooves of the pair being arcuate in cross section and aligned to at least partially receive the electrical conductor therebetween. In the embodiment of FIGS. 2 and 4, the upper plate 43 includes a raised shoulder 52 on the opposing surface 48 and which extends in the longitudinal direction and is sized and positioned to be received within the groove 53 on the surface 49 of the lower plate 44 when the plates are pressed together. The shoulder 52 in turn includes a groove 54 extending along the longitudinal length thereof, and such that the grooves 53, 54 of the two opposing surfaces are adapted to receive a conductor of relatively small size therebetween. Further, the grooves 53, 54 include transverse ridges 58 as further described below for bitingly engaging the conductor.

Figure 8:
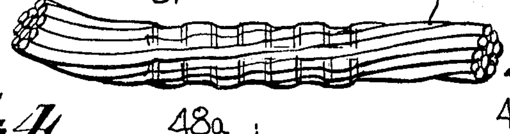
FIG. 8 is a fragmentary view of a section of an electrical conductor, which illustrates the impressions formed therein by the clamping plates of FIGS. 5 and 7.

In the embodiment of FIGS. 5, 7, 9, and 10, the grooves **53*a*, 54*a* of the two plates 43*a*, 44*a* are of approximately equal size and are arcuately curved in cross-section. Further, the two grooves 53*a*, 54*a* include transverse ridges 58 for bitingly engaging the electrical conductor positioned therebetween. More particularly, these ridges 58 tend to bite into the conductor in the manner illustrated in FIG. 8, to prevent the longitudinal separation of the conductor from the plates. The outer surfaces of the plates 43*a*, 44*a* are essentially flat, and each includes ridges in the form of a plurality of longitudinally spaced apart indentations 61 formed in the flat surfaces thereof. Thus, the top plate 43*a* may be removed from the bolts and inverted in the manner illustrated in FIG. 10**, and so that an electrical conductor of a different size may be effectively gripped by the plates.

FIG. 6 illustrates still another embodiment of the plates **43*b*, 44*b* which is generally similar in construction to that shown in FIG. 4, but with the grooves 53*b*, 54*b*** being of somewhat larger size so as to accommodate larger conductors.

Figure 3:
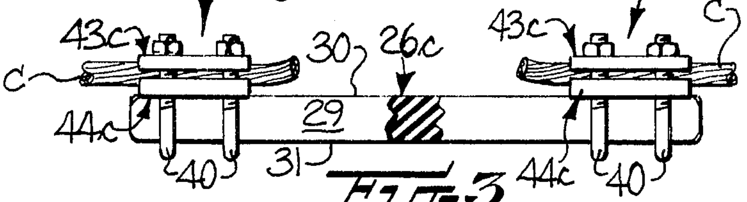
FIG. 3 is a side elevation view of a second embodiment of a breaking and insulating clamp according to the present invention.
Figure 7:
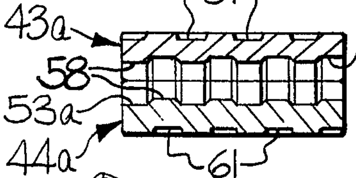
FIG. 7 is a side sectional view of the embodiment shown in FIG. 5, and taken substantially along the line 7—7.

FIG. 3 illustrates another embodiment of the invention wherein the bar **26*c* includes two longitudinally spaced apart pairs of cooperating channels 33, 34 (FIG. 2) formed in the bar at each of the two clamping locations. Each of the clamping members 36*c* thus further includes a second like U-shaped bolt 40 received within the second pair of channels at each clamping location, and the plates 43*c*, 44*c*** each include four apertures for receiving the four legs of the two bolts. This arrangement is designed for heavy duty use, involving particularly large conductors.

In the drawings and specification, there has been set forth a preferred embodiment of the invention, and although specific terms are employed, they are used in a generic and descriptive sense only and not for purposes of limitation.

That which is claimed is:

1. A breaking and insulating clamp for tensioned electrical conductors and the like, and which is characterized by the ability to clamp spaced portions of the conductor to permit the severance of the conductor between the spaced portions while maintaining the tensioned condition of the conductor, and comprising an elongate bar composed of an electrical insulating material having a relatively high tensile strength, said bar defining a longitudinal direction along its length and including shoulder means disposed on the exterior surface thereof at each of two longitudinally spaced apart clamping locations, clamping means mounted on said bar at each of said spaced apart clamping locations for separately securing a portion of an electrical conductor or the like at each location, each of said clamping means comprising (a) bolt means having two parallel legs, with said legs straddling said bar and positioned adjacent said shoulder means so as to preclude relative longitudinal movement between the bar and bolt, and with the legs having a length sufficient to extend beyond the surface of the bar, (b) a pair of cooperating plates each having a pair of apertures, with the apertures of the plates being received on the portions of the legs of the associated bolt means which extend beyond the bar, said plates defining opposing surfaces adapted to receive therebetween an electrical conductor or the like which extends in the longitudinal direction and between the legs of the associated bolt, and (c) means for clampingly pressing the cooperating plates together so that the plates are adapted to securely retain the electrical conductor or the like extending therebetween.

2. The breaking and insulating clamp as defined in claim 1 wherein at least one of the opposing surfaces of said plates includes integral ridge means for bitingly engaging an electrical connector positioned therebetween.

3. The breaking and insulating clamp as defined in claim 1 wherein the opposing surfaces of each of said pair of plates each includes a groove extending in the longitudinal direction with the grooves of the pair being aligned to at least partially receive the electrical conductor therebetween.

4. The breaking and insulating clamp as defined in claim 3 wherein said grooves are each arcuate in cross section and include transverse ridge means for bitingly engaging the electrical conductor positioned therebetween.

5. The breaking and insulating clamp as defined in claim 1 wherein one of the opposing surfaces of said plates includes a groove extending in the longitudinal direction, and the other of the opposing surfaces includes a raised shoulder extending in the longitudinal direction and which is sized and positioned so as to be received within the groove of the other surface when the plates are pressed together.

6. The breaking and insulating clamp as defined in claim 5 wherein said raised shoulder includes a groove extending along its length, and such that the grooves of the two opposing surfaces are adapted to receive a conductor of relatively small size therebetween.

7. The breaking and insulating clamp as defined in any one of claims 3–6 wherein each of said plates further includes a flat second surface on the side opposite its opposing surface with at least one of said second surfaces including ridge means in the form of longitudinally spaced apart indentations in the surface thereof, and whereby the plates may be mounted on said bolts with at least said one of said second surfaces positioned inwardly toward the other plate and so that electrical conductors of varying size may be effectively gripped by the selective arrangement of the plates.

8. The breaking and insulating clamp as defined in claim 1 wherein said shoulder means comprises at least one channel formed in the surface of the bar which extends in a direction substantially perpendicular to the longitudinal direction, and wherein one of the legs of the associated bolt means is received within each such channel.

9. A breaking and insulating clamp for tensioned electrical conductors and the like, and which is characterized by the ability to clamp spaced portions of the conductor to permit the severance of the conductor between the spaced portions while maintaining the tensioned condition of the conductor, and comprising an elongate bar composed of an electrical insulating material having a relatively high tensile strength, said bar defining a longitudinal direction along its length and including opposite side faces each extending along the longitudinal length of the bar, and a pair of cooperating channels formed in the bar at each of two longitudinally spaced apart clamping locations, with the channels of each pair being formed in the surface of respective side walls and extending parallel to each other and in a direction substantially perpendicular to the longitudinal direction, clamping means mounted on said bar at each of said spaced apart clamping locations for separately securing a portion of an electrical conductor or the like at each location, each of said clamping means comprising (a) a U-shaped bolt having two parallel legs received within respective channels of the associated pair of channels so as to preclude relative longitudinal movement between the bar and bolt, and with the legs having a length sufficient to extend beyond the surface of the bar, (b) a pair of cooperating plates each having a pair of apertures, with the apertures of the plates being received on the portions of the legs of the associated bolt which extend beyond the bar, said plates defining opposing surfaces adapted to receive therebetween an electrical conductor or the like which extends in the longitudinal direction and between the legs of the associated bolt, and (c) means for clampingly pressing the cooperating plates together so that the plates are adapted to securely retain the electrical conductor or the like extending therebetween.

10. The breaking and insulating clamp as defined in claim 9 wherein said legs of each said U-shaped bolts are laterally spaced apart a distance so as to clampingly engage the associated channels of the bar therebetween, to thereby securely retain the assembly of the bolts on the bar.

11. The breaking and insulating clamp as defined in claim 9 or 10 wherein said bar includes two longitudinally spaced apart pairs of said cooperating channels formed in the bar at each of the two clamping locations, and each of said clamping means further comprises a second like U-shaped bolt received within the channels of the second pair of channels, and said plates each include four apertures which are received on the legs of the two bolts, and said clamping means comprises a nut threadedly mounted on each of the legs of each bolt for clampingly pressing the cooperating plates together.

12. The breaking and insulating clamp as defined in claim 9 wherein said bar is generally rectangular in cross section, and is fabricated from a fiberglass reinforced plastic material.

13. The breaking and insulating clamp as defined in claim 9 wherein said means for clampingly pressing the cooperating plates together includes a nut threadedly received on each leg of each bolt, and whereby the nuts are adapted to press the plates against the adjacent surface of the bar.

* * * * *